A. G. STEVENS.
Improvement in Furniture-Casters.
No. 114,061.             Patented April 25, 1871.
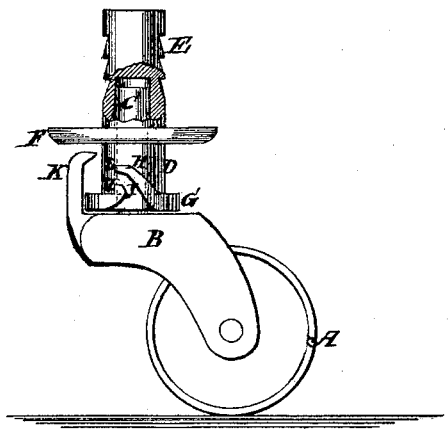
Witnesses:
E. Wolff
Wm. H. C. Smith.
Inventor:
A. G. Stevens
PER Munn & Co.
Attorneys.

UNITED STATES PATENT OFFICE.

AUGUSTUS G. STEVENS, OF MANCHESTER, NEW HAMPSHIRE.

IMPROVEMENT IN FURNITURE-CASTERS.

Specification forming part of Letters Patent No. 114,061, dated April 25, 1871.

*To all whom it may concern:*

Be it known that I, AUGUSTUS G. STEVENS, of Manchester, in the county of Hillsborough and State of New Hampshire, have invented a new and useful Improvement in Casters; and I do hereby declare that the following is a full, clear, and exact description thereof, which will enable others skilled in the art to make and use the same, reference being had to the accompanying drawing, forming part of this specification.

This invention relates to a new and useful improvement in casters for furniture and other purposes; and consists in the construction and arrangement of parts in the manner hereinafter described and as claimed.

The accompanying drawing represents a sectional side view of my improved caster.

Similar letters of reference indicate corresponding parts.

A is the caster-wheel. B is the stirrup, in which the wheel is secured on pivots, in the usual manner. C is the shank or stem, which is rigidly connected with the stirrup. D is the socket, which is driven into the wood or end of the leg.

The outer surface of the socket is notched or serrated, as seen in the drawing at E, so that when it is driven into the leg the wood will expand into the notches and serve to hold it fast.

F is a collar on the socket, which receives the end of the leg, to which it is fastened by means of screws, in the usual manner. The screws driven into the end of the leg in this manner sometimes (frequently, in fact) get loose; hence the necessity for the notches E.

G is a collar on the bottom of the socket, running nearly round on a true or regular line; but its ends are turned up, one forming an inclined plane, as seen at H, with point L overlapping the other end, which has a stop, as seen at I, with an open space or groove, J, between the two.

The object of point L overlapping is to prevent hook K from entering the open space J and separating the stirrup and socket.

K is a hook, attached to the back of the stirrup. This hook engages with the collar G, and prevents the wheel and stirrup from dropping out when the piece of furniture is raised from the floor.

When the two parts (stirrup and socket) are put together, the hook K is introduced through the open space J. When once the hook is above the collar the caster may be revolved and the furniture may be lifted from the floor without danger of the stirrup and wheel dropping out.

If the caster is revolved in one direction, the hook will be stopped at I; if in the other direction, the hook will slide up the inclined surface H and drop onto the collar.

By properly guiding the hook the two parts are readily separated, which, in moving furniture and for other purposes, is a great advantage.

Having thus described my invention, I claim as new and desire to secure by Letters Patent—

The hook K and the incline and stop, forming a bayonet-fastening for the hook, when said incline and stop are below the socket flange or collar F, and upon the exterior of the tubular shank, substantially as specified.

AUGUSTUS G. STEVENS.

Witnesses:
G. P. ROCKWELL,
L. B. CLOUGH.